United States Patent
Nakamura et al.

(10) Patent No.: US 8,552,851 B2
(45) Date of Patent: Oct. 8, 2013

(54) OPERATION STATE JUDGEMENT METHOD AND SYSTEM

(75) Inventors: Nobutatsu Nakamura, Tokyo (JP); Kouji Kida, Tokyo (JP)

(73) Assignee: NEC Corporation, Tokyo (JP)

(*) Notice: Subject to any disclaimer, the term of this patent is extended or adjusted under 35 U.S.C. 154(b) by 368 days.

(21) Appl. No.: 12/991,781

(22) PCT Filed: May 7, 2009

(86) PCT No.: PCT/JP2009/058606
§ 371 (c)(1),
(2), (4) Date: Nov. 9, 2010

(87) PCT Pub. No.: WO2009/136616
PCT Pub. Date: Nov. 12, 2009

(65) Prior Publication Data
US 2011/0057784 A1   Mar. 10, 2011

(30) Foreign Application Priority Data
May 9, 2008  (JP) ................. 2008-122925

(51) Int. Cl.
*B60Q 1/00*   (2006.01)
(52) U.S. Cl.
USPC .............................. 340/439; 340/575; 701/25
(58) Field of Classification Search
USPC ........... 340/439, 575, 576, 436, 438; 701/25, 701/33.4
See application file for complete search history.

(56) References Cited

U.S. PATENT DOCUMENTS

| | | | | |
|---|---|---|---|---|
| 6,575,902 | B1 * | 6/2003 | Burton | 340/575 |
| 7,042,345 | B2 * | 5/2006 | Ellis | 340/436 |
| 7,046,130 | B2 * | 5/2006 | Kusano | 340/439 |
| 7,079,927 | B1 * | 7/2006 | Tano et al. | 701/25 |
| 7,584,034 | B2 * | 9/2009 | Kosugi | 340/436 |
| 2004/0044293 | A1 * | 3/2004 | Burton | 600/544 |

FOREIGN PATENT DOCUMENTS

| | | |
|---|---|---|
| JP | 6-162396 A | 6/1994 |
| JP | 2004038489 A | 2/2004 |
| JP | 2004234418 A | 8/2004 |
| JP | 2007233731 A | 9/2007 |
| JP | 2008097376 A | 4/2008 |

OTHER PUBLICATIONS

International Search Report for PCT/JP2009/058606 mailed Jun. 2, 2009.

* cited by examiner

*Primary Examiner* — John A Tweel, Jr.

(57) ABSTRACT

A vehicle state determination unit receives vehicle data from a vehicle sensor and position data from a position sensor with a certain frequency. A mode selection unit selects a driving operation mode on the basis of the data received from the vehicle state determination unit and passes the data to a data comparison unit. The data comparison unit reads out model data of the driving operation mode specified by the mode selection unit, from a model data storage unit, compares data received from the vehicle state determination unit and the model data, and passes the comparison result to a driving state determination unit. The driving state determination unit statistically processes the comparison result received from the data comparison unit and passes the result of the determination to a warning display unit.

21 Claims, 13 Drawing Sheets

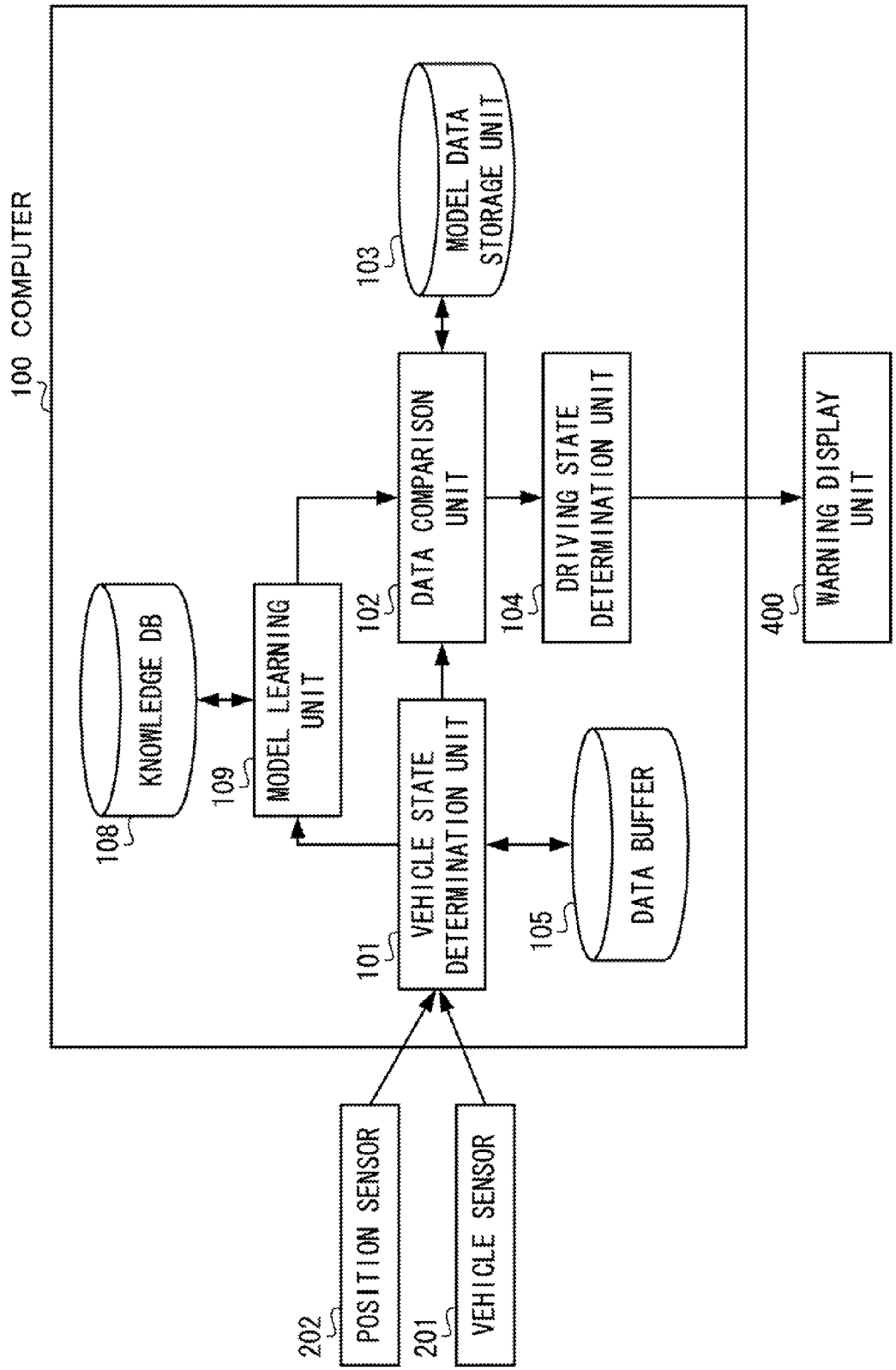

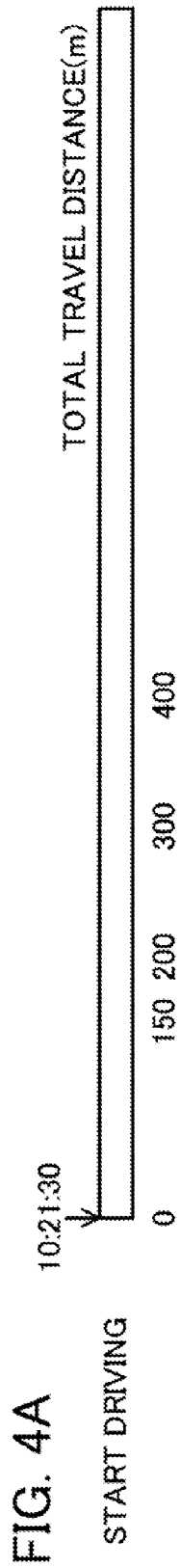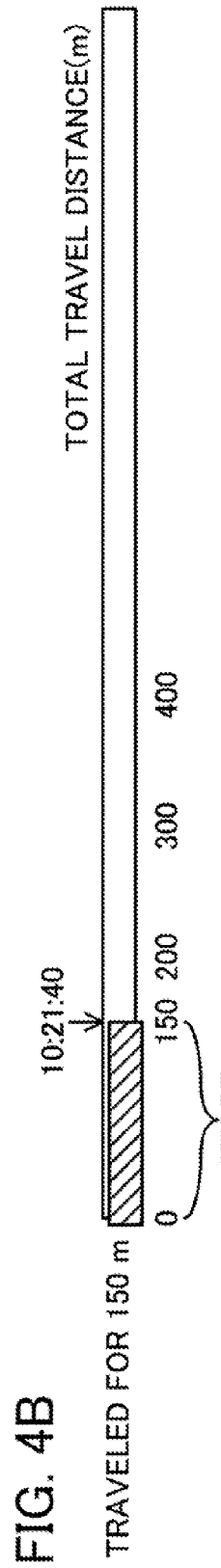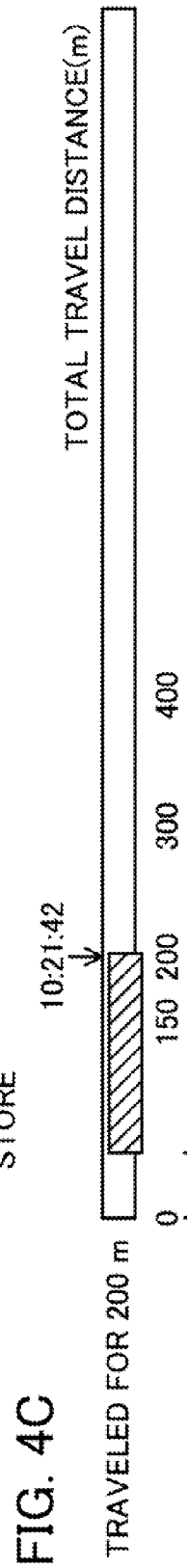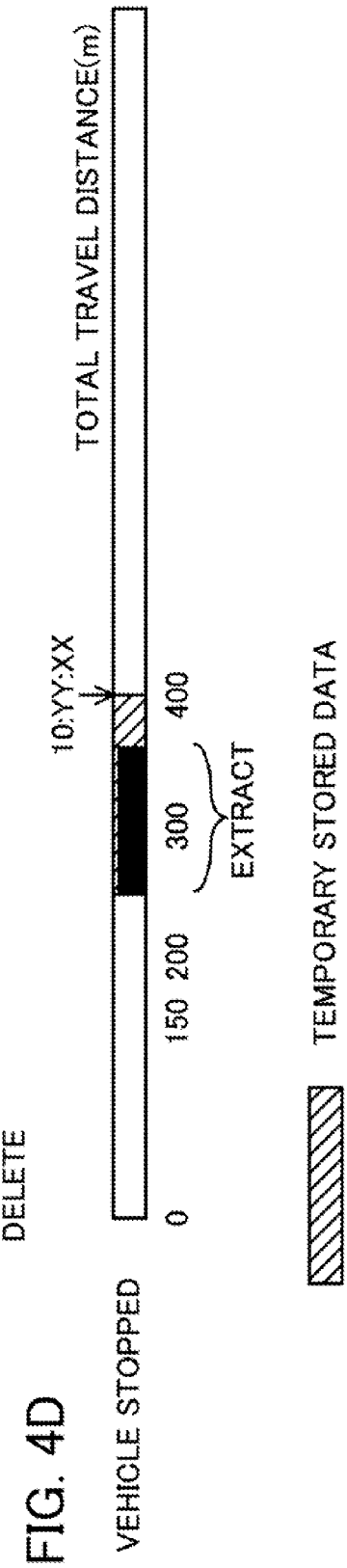

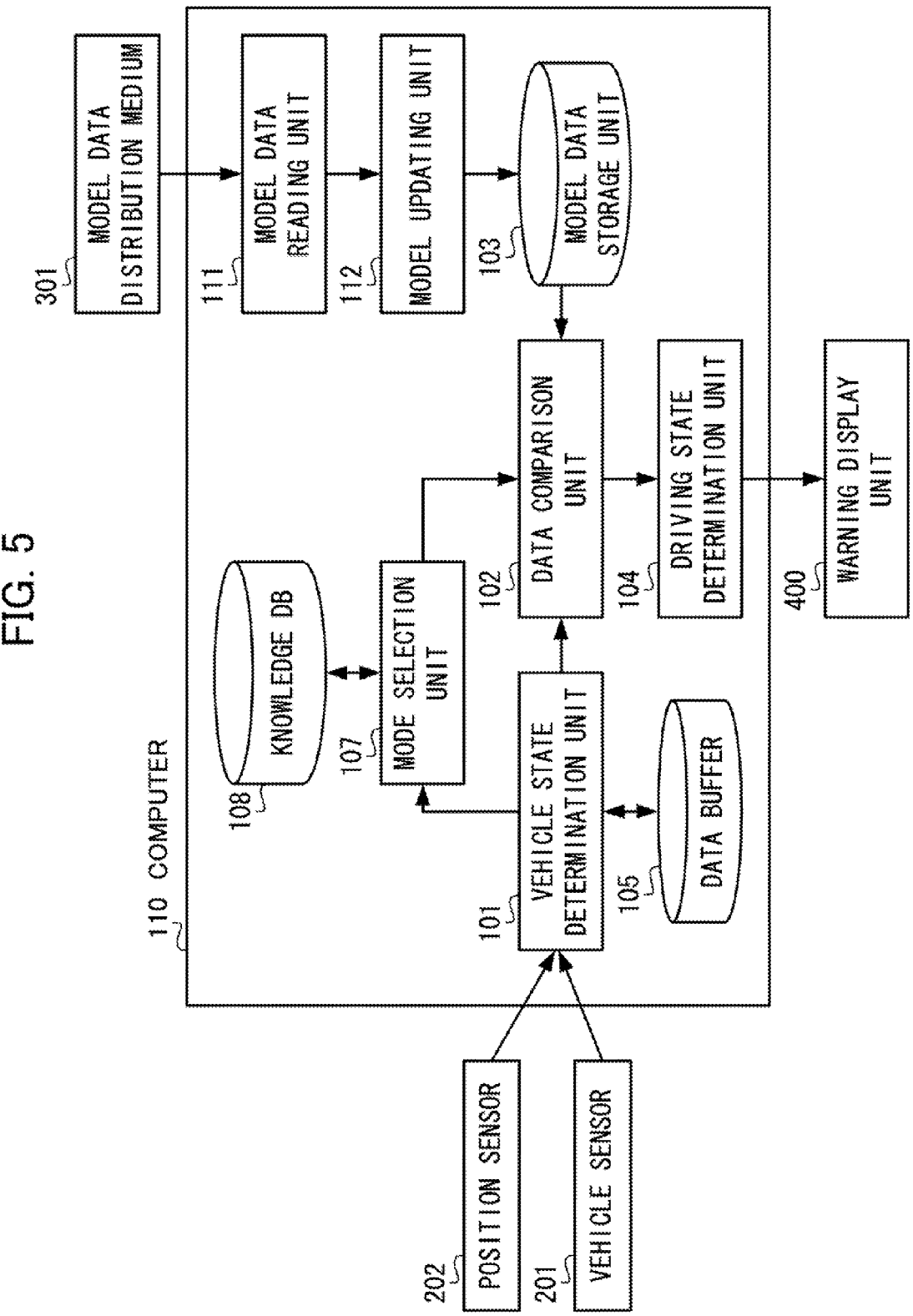

FIG. 10

```
svm_type c_svc
kernel_typerbf
gamma0.2
nr_class2
total_sv1198
rho1.98588
label01
probA-0.7265
probB0.117598
nr_sv599599
SV
10:0.4421:0.12:0.5663:0.25835844:-0.028825:0
10:0.4421:02:0.573:0.25364184:-0.0271665:0
10:0.4431:0.12:0.5753:0.2510784:-0.0256385:0
10:0.4441:0.12:0.5793:0.24856684:-0.0251125:0
10:0.4441:02:0.5833:0.24599544:-0.0257145:0.5922
10:0.4451:0.12:0.5673:0.2433124:-0.0288345:0.5922
10:0.4461:0.12:0.5913:0.24055584:-0.0275625:0.5996
10:0.4461:0.2:0.5953:0.2378414:-0.0271485:0
```

| DEGREE OF RISK | ACCIDENT OCCURRENCE INFORMATION |
| --- | --- |
| 1 | SHARP CURVE, ROAD SURFACE FREEZING |
| 2 | FREQUENT INJURY ACCIDENT |
| 3 | FREQUENT FATAL ACCIDENT |

OPERATION STATE JUDGEMENT METHOD AND SYSTEM

TECHNICAL FIELD

The present invention relates to a driving state determination method, in particular relates to a driving state determination method to determine the driving state by detecting the difference between the current driving operation of a driver and the normal driving operation of the driver. The present invention further relates to a driving state determination system that employs such a driving state determination method, and a recording medium for storing the program used in the system.

BACKGROUND ART

The driving state determination processing method is well known in that the traveling information of a vehicle, especially a change in vehicle speed and a tendency in a time period of change, is used to analyze the traveling state of the vehicle and determine the driving state of the driver (see, e.g., Patent Literature 1).

FIG. 13 illustrates the driving state determination processing device described in Patent Literature 1. The driving state determination processing device (in-vehicle device) 901 includes a vehicle speed sensor 911, a road type determination unit 912, an in-vehicle storage device 913, a traveling state determination unit 914, a determination condition setting unit 915 and a portable storage medium 916. The driving state determination processing device 901 determines the driving state of the traveling vehicle 902 and informs the driver of the traveling vehicle 902 about the determination result 917 through a sound or an image. The traveling state determination unit 914 includes a moving average calculation unit 941 and a low level of consciousness determination unit 942.

The vehicle speed sensor 911 detects the speed of the traveling vehicle 902. The road type determination unit 912 determines the type of road where the traveling vehicle 902 is running on the basis of the speed detected by the vehicle speed sensor 911, and if the type of road is targeted, the speed and acquisition time is stored in the in-vehicle storage device 913.

The traveling state determination unit 914 calculates the average speed and the acceleration within a predetermined section from the vehicle speed stored in the in-vehicle storage device 913, holds the average speed and acceleration with the acquisition time, and extracts a time point where the acceleration is reversed from the sign at the last time point. With respect to the section containing the extracted time point where the sign of the acceleration changes plus-minus-plus, the traveling state determination unit 914 determines whether the time length of the section is within a predetermined time period and whether the difference between the maximum speed and the minimum speed within the extracted section is within a predetermined range. If the result of the determination is positive, the traveling state determination unit 914 determines that the section is a single waveform section representing a low level of consciousness and outputs the determination result 917.

Patent Literature 1: Unexamined Japanese Patent Application KOKAI Publication No. 2004-234418

DISCLOSURE OF INVENTION

Problem Solved by the Invention

However, in the driving state determination processing device, the driving state cannot be accurately determined by detecting only the vehicle speed and acceleration. It is because, even in a similar accelerating or decelerating pattern, the driving state is normal in some driving environments, but it is abnormal in other driving environments. In Patent Literature 1, the driving environment, that is, the road type is determined on the basis of the time and the vehicle speed and the traveling state is determined according to the road type. However, factors affecting the traveling state include another vehicle such as a preceding vehicle, road gradient and road conditions such as the road surface condition, and these factors also affect the determination of the driving state. Furthermore, the acquired data normally contains noise, and if the difference between normal driving and abnormal driving is small, it is often difficult to determine the driving state.

Furthermore, the aforementioned driving state determination processing device cannot deal with the difference between individuals. It is because it does not have the function of changing the determination for each driver. For example, for a driver who usually drives roughly, the device always displays warning information, and the driver stops the operation of the driving state determination system or ignores its result of the determination. Accordingly, the aforementioned driving state determination processing device cannot convey information that suits each driver's driving characteristics, or it is not appreciated by the driver, which are problems.

In view of the aforementioned problems, an objective of the present invention is to provide a driving state determination method in which the driving state can be adaptively determined by various driving environments and according to individual difference among drivers. Furthermore, another objective of the present invention is to provide a driving state determination system that uses such a method, and a record medium that stores the program used in the system.

Means for Solving the Problems

The first aspect of the present invention provides a driving state determination method including the steps of: detecting sensor data including vehicle data and position data, the vehicle data including at least the current speed and acceleration of the automobile that is subject to the driving state determination, the position data indicating the current position of the automobile; determining the vehicle state of the automobile on the basis of the sensor data; selecting one driving operation mode that corresponds to the vehicle state determined in the step of determining, from a plurality of driving operation modes; comparing the sensor data and model data of the selected driving operation mode; and determining the driving state on the basis of the result obtained in the step of comparing.

The second aspect of the present invention provides a driving state determination system including: a sensor to detect sensor data including vehicle data and position data, the vehicle data including at least the current speed and acceleration of the automobile that is subject to the driving state determination, the position data indicating the current position of the automobile; a vehicle state determination unit to determine the vehicle state of the automobile on the basis of the sensor data; a selection unit to select one driving operation mode that corresponds to the vehicle state determined in the vehicle state determination processing, from a plurality of driving operation modes; a holding unit to hold model data for each of the driving operation modes; a comparison unit to compare the sensor data and model data of the selected driving operation mode; and a driving state determination unit to determine the driving state on the basis of the comparison result in the comparison unit.

The third aspect of the present invention provides a computer-readable recording medium that is coded by a computer program running on a computer, the program makes a computer perform processing of detecting sensor data including vehicle data and position data, the vehicle data including at least the current speed and acceleration of the automobile that is subject to the driving state determination, the position data indicating the current position of the automobile; determining the vehicle state of the automobile on the basis of the sensor data; selecting one driving operation mode that corresponds to the vehicle state determined in the determination step, from a plurality of driving operation modes, on the basis of the vehicle state data determined in the vehicle state determination unit; comparing the sensor data and model data of the selected driving operation mode; and determining the driving state on the basis of the comparison result obtained in the comparison step.

Effect of the Invention

According to the present invention, whether the driving is normal driving can be accurately determined in various driving environments, and the driving state can be adaptively determined according to individual differences among respective drivers, thereby providing optimal driving guidance to the driver.

The aforementioned and other features and benefits of the present invention will be apparent from reading the description below with reference to the drawings.

BRIEF DESCRIPTION OF DRAWINGS

FIG. 3 is a block diagram illustrating the generation of the driving operation mode according to the embodiment in FIG. 1.
FIGS. 4A to 4D are diagrams for additionally explaining Step S6 in FIG. 2.
FIG. 5 is a block diagram according to the second embodiment of the present invention.
FIG. 10 is a diagram illustrating one example of SVM learning model.
FIG. 12 is a table illustrating one example of risk occurrence information according to the degree of risk.

BEST MODE FOR CARRYING OUT THE INVENTION

The driving state determination system according to the present invention includes, at its minimum constitution: a sensor to detect sensor data including vehicle data and position data, the vehicle data including at least the current speed and acceleration of the automobile that is subject to the driving state determination, the position data indicating the current position of the automobile; a vehicle state determination unit to determine the vehicle state of the automobile on the basis of the sensor data; a selection unit to select one driving operation mode that corresponds to the vehicle state determined in the vehicle state determination processing, from a plurality of driving operation modes; a holding unit to hold model data for each of the driving operation modes; a comparison unit to compare the sensor data and model data of the selected driving operation mode; and a driving state determination unit determining the driving state on the basis of the comparison result in the comparison unit.

In the driving state determination system according to the aforementioned aspect, model data is stored for each driving operation mode, and the model data and a vehicle sensor data are compared to determine the driving state. Therefore, the driving state can be adaptively determined in various driving environments and according to individual differences among respective drivers. The embodiments according to the present invention will be described with reference to drawings.

First Embodiment

Figure 1:
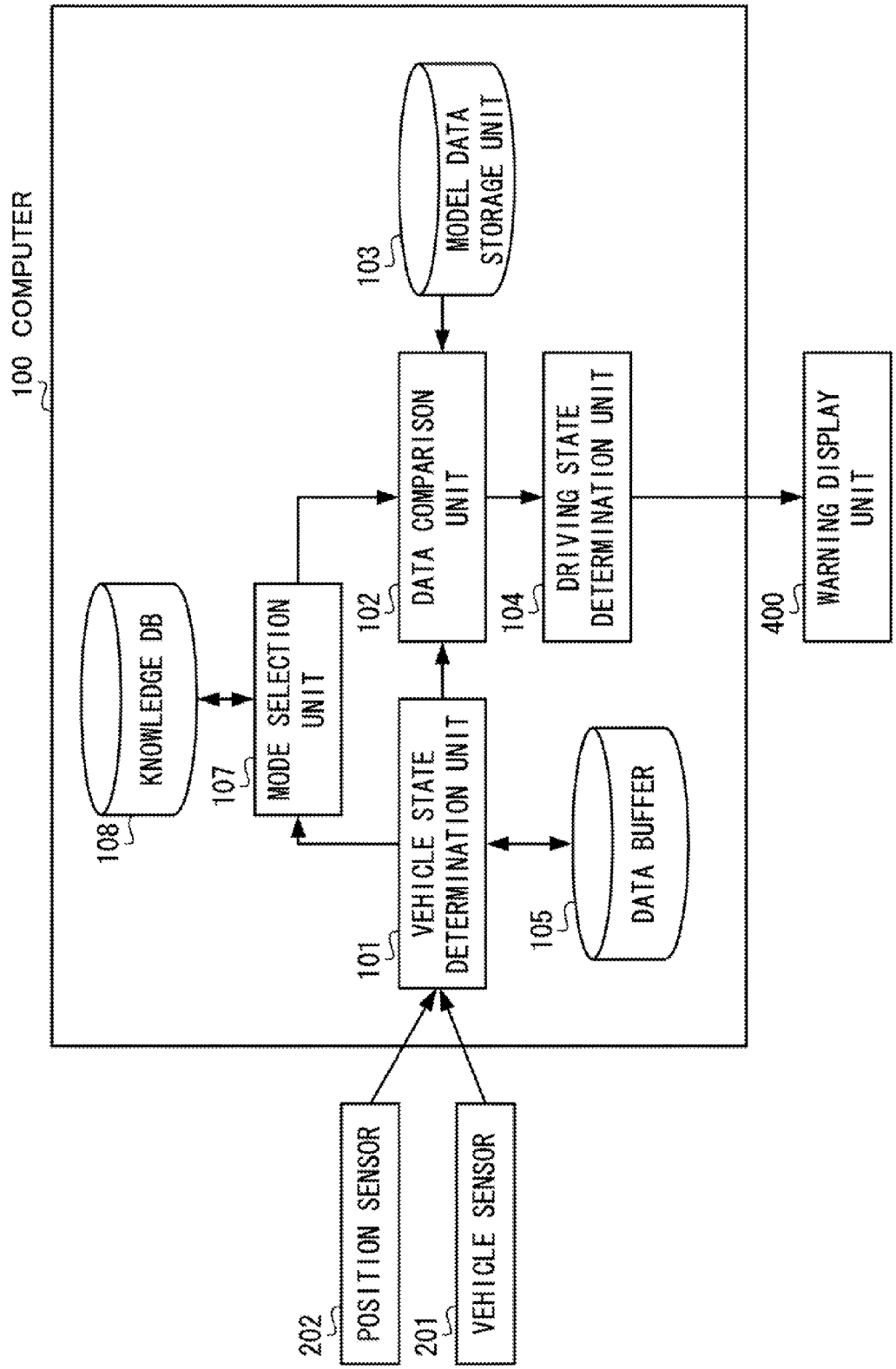
FIG. 1 is a block diagram according to the first embodiment of the present invention.

FIG. 1 illustrates a block diagram of a driving state determination system according to the first embodiment of the present invention. The driving state determination system according to this embodiment is composed of a computer (a central processing unit, a processor, or a data processing device) 100 operated by program control, a vehicle sensor 201, a position sensor 202 and a warning display unit 400. The vehicle sensor 201 measures various vehicle data of the vehicle (hereinafter also referred to as an automobile) on which this system is mounted, such as the speed, acceleration, the stepping pressure on the brake pedal, the stepping pressure on the accelerator, and the distance from the preceding vehicle. The position sensor 202 measures position data of the automobile on which this system is mounted, such as the latitude, longitude and altitude. The warning display unit 400 displays a warning to the driver of the automobile on which this system is mounted. The warning display unit 400 includes a unit for providing information through a sound, an image or a vibration.

The computer 100 may or may not be mounted on the automobile. If the computer 100 is mounted on the automobile, the vehicle sensor 201, position sensor 202 and warning display unit 400 are connected via a network within the automobile vehicle. If the computer 100 is not mounted on the automobile, the computer 100, vehicle sensor 201, position sensor 202 and warning display unit 400 are connected via a network outside the vehicle, such as a road-to-car communication system and a car-to-car communication system.

The computer 100 includes a vehicle state determination unit 101, a data comparison unit 102, a model data storage unit 103, a driving state determination unit 104, a data buffer 105, a mode selection unit 107 and a knowledge database (DB) 108. The model data storage unit 103 and knowledge database 108 may be installed apart from the body of the computer 100: These function units of the computer 100 generally operate as follows.

The vehicle state determination unit 101 receives vehicle data and position data from the vehicle sensor 201 and position sensor 202 respectively with a certain frequency, writes the vehicle data and position data on the data buffer 105 according to the current vehicle state, and passes them to the data comparison unit 102 and mode selection unit 107. The mode selection unit 107 selects the driving operation mode on the basis of the data received from the vehicle state determination unit 101 and information associating the vehicle state with the driving operation mode held in the knowledge database 108, and passes the selected driving operation mode to the data comparison unit 102.

The data comparison unit 102 reads out model data on the driving operation mode specified by the mode selection unit 107, from the model data storage unit 103, compares the data received from the vehicle state determination unit 101 and the model data of the specified driving operation mode, and passes the comparison result to the driving state determination unit 104. The driving state determination unit 104 statistically processes the comparison result received from the data comparison unit 102 and passes the result of the determination to the warning display unit 400.

Figure 2:
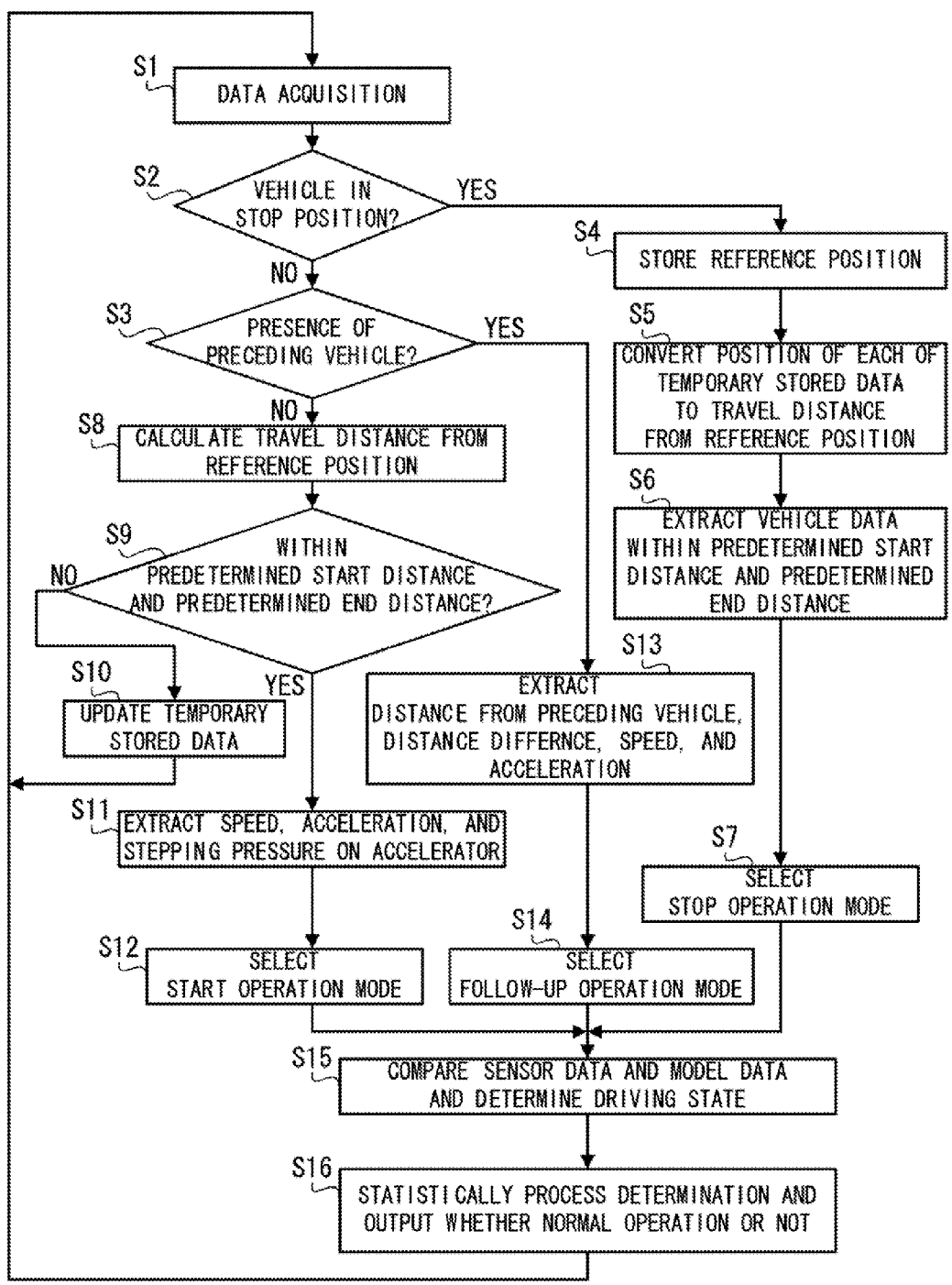
FIG. 2 is a flow chart illustrating the operation according to the first embodiment of the present invention.

Next, with reference to the flow chart in FIG. 2, the whole operation of the embodiment according to FIG. 1 will be described in detail. The vehicle state determination unit 101 receives the vehicle data and position data from the vehicle sensor 201 and position sensor 202 respectively with a certain frequency (Step S1 in FIG. 2). Next, the vehicle state determination unit 101 examines whether the vehicle to be determined on which the vehicle sensor 201 and position sensor 202 are mounted is stopped, based on the acquired vehicle data (Step S2).

If the vehicle is stopped, the vehicle state determination unit 101 stores the current position as a reference position in the data buffer 105, based on the acquired position data (Step S4). Next, data temporarily stored in the data buffer 105 are read out and the position of each of the data is converted to the travel distance from the reference position (Step S5). Here, "the position of each of the data" actually means the travel distance from the vehicle sensor 201 from the beginning of measurement. The same calculation can be performed using position data from GPS, which is another sensor data.

Next, the vehicle state determination unit 101 extracts vehicle data such as the speed, acceleration, and the stepping pressure on the brake pedal within a travel distance range between a predetermined start distance and a predetermined end distance (Step S6). That is, the vehicle state determination unit 101 extracts the vehicle stop operation. Here, "the start distance" indicates the travel distance at which extraction starts, and "the end distance" indicates the travel distance at which extraction ends. Then, the mode selection unit 107 selects the stop operation at the vehicle position as the driving operation mode (Step S7).

If the vehicle state determination unit 101 determines that the vehicle is not stopped in Step S2, it examines whether there is a preceding vehicle within a predetermined distance from the vehicle to be determined, based on the acquired vehicle data (Step S3). If there is a preceding vehicle, the distance from the preceding vehicle, the difference between its distance and the distance from the preceding vehicle the previous time, and the speed and acceleration of the vehicle to be determined are extracted on the basis of the vehicle data (Step S13). That is, a follow-up driving operation of the vehicle is extracted. Next, the mode selection unit 107 selects the follow-up driving operation at the vehicle position as the driving operation mode (Step S14).

If the vehicle state determination unit 101 determines that there is no preceding vehicle in Step S3, it calculates the travel distance from the reference position that is the immediately preceding stop position set in Step S4 (Step S8). Next, the vehicle state determination unit 101 determines whether the travel distance is between the predetermined start distance and the predetermined end distance (Step S9). The start distance needs to be specified, but the end distance may not be specified. If the end distance is not specified, the end distance is 0 m that is identical to the stop position. A predetermined default value may be set as the start distance.

If the vehicle state determination unit 101 determines that the travel distance is between the predetermined start distance and the predetermined end distance in Step S9, it extracts the speed, acceleration and the stepping pressure on the accelerator from the acquired vehicle data (Step S11). That is, it extracts a start (travel) driving operation. Next, the mode selection unit 107 selects the start operation at the vehicle position as the driving operation mode (Step S12).

If the vehicle state determination unit 101 determines that the calculated travel distance is not between the predetermined start distance and the predetermined end distance in Step S9, the data of that time is temporarily stored in the data buffer 105 (Step S10). The data may be used for the stop driving operation determination that is processed in Steps S5 and S6. Old data in data buffer 105, that is, data at the position farther than the travel distance extracted in Step S6 may be deleted.

The above processing will be described in more detail with reference to FIG. 4. Here, it is assumed that the start distance and end distance are set to 150 m and 50 m, respectively. Driving is started at 10:21:30 as schematically illustrated in FIG. 4A, and the travel distance has reached 150 m at 10:21:40 as schematically illustrated in FIG. 4B. In this case, the data buffer 105 stores various data before the travel distance reaches 150 m.

After that, assuming that the driving further continues and the traveling distance reaches 200 m at the time of 10:21:42, data covering a portion more than 150 m apart from the position of 200 m (data from the start of driving to the position of a travel distance 50 m) is deleted from the data buffer 105 as schematically illustrated in FIG. 4C. Next, assuming that the vehicle is stopped at the position of the travel distance of 400 m at 10:XX:YY as schematically illustrated in FIG. 4D, data is extracted from the data buffer 105, which covers a range between the start distance that is 150 m before the position of the travel distance 400 m and the end distance that is 50 m before the travel distance 400 m where the vehicle is stopped.

Returning to FIG. 2, the mode selection unit 107 selects any of the stop operation modes at the vehicle position, the start operation mode at the vehicle position, or a follow-up operation mode at the vehicle position as the driving operation mode (Steps S7, S12, S14). When any of the driving operation modes is selected, the data comparison unit 102 compares each sensor data set with the model data of the selected driving operation mode and determines the driving state (Step S15). This determination is made whether sensor data correspond to model data, that is, whether the driving is normal driving.

Next, the driving state determination unit 104 statistically processes the comparison result during a certain period or within a certain section in Step S15, and outputs the result of the determination regarding whether the driving is abnormal driving on the basis of the statistical processing result (Step S16). That is to say, in Step S16, the driving state determination unit 104 determines abnormal driving if the statistical processing rate indicating abnormal driving in Step S15 is higher than the predetermined threshold, and determines normal driving if it is less or equal to the predetermined threshold. Then, processing returns to Step S1 and repeats the next data acquisition.

As described above, in Step S16, determination processing is performed whether the driving is normal driving or abnormal driving, based on the statistical processing of the comparison result in Step S15. This determination utilizes an approach in which the identification parameter is composed of model data of normal driving and other data, and input data is identified based on the identification parameter. The approaches that can be used for the identification are well known as described in the literature (e.g., Syunichi Amari et al. "Statistics of Pattern. Recognition and Learning", Iwanami Shoten, April, 2003, ISBN-13:978 to 4000068468) and are various, and therefore are not described in detail here. The approaches described in this literature are incorporated into the present specification by reference.

In selecting the driving operation mode in Steps S7, S12 and S14, the driving operation mode can be selected according to the position of the vehicle, and the user. For example, a plurality of driving operation modes are prepared that are previously generated for each individual or group, and one driving operation mode is selected that is suitable for the individual user or group, referring to the user information or selecting by the user. In selecting according to the vehicle position, the road characteristic (presence of an intersection or a zebra crossing and a sloping road) is extracted, referring to the map database in the knowledge database 108, and one driving operation mode is selected that is suitable for the extracted road characteristic. In this way, the driving operation mode is selected according to the driving operation state.

Next, the method for generating model data of each of the driving operation mode stored in the model data storage unit 103 will be described, with reference to FIG. 3. The computer 100 in FIG. 3 includes a model learning unit 109 instead of the mode selection unit 107 of the computer illustrated in FIG. 1. In other words, the driving state determination system according to the first embodiment has a configuration illustrated in FIG. 3 in which the computer 100 generates a model, and a configuration illustrated in FIG. 1 in which the model is used to perform identification. That is, according to the first embodiment, the model learning unit 109 learns a model, and after that the mode selection unit 107 uses the model to perform selection.

The computer 100 illustrated in FIG. 3 operates as follows. In FIG. 3, the knowledge database 108 stores reference data for determining whether data to be learned is for normal driving, dangerous driving or unhurried driving, such as the driver's personal information, and the road characteristic. The model learning unit 109 receives data from the vehicle state determination unit 101, and provides the result of the determination of true or false regarding the item to be determined, among items of the data. For example, normal driving may be set to "1", and dangerous driving may be set to "0". The list generated in this way and machine learning technology are used to generate a model (model data) for each mode. Examples of machine learning technology such as Support Vector Machine (SVM), Bayesian network, hidden Markov model are well known, but any machine learning technology can be used. That is, the learning model of the driving operation mode is generated according to the driving operation state including the individual driver, the group and the road characteristic. Model data generated by machine learning may be stored directly in the model data storage unit 103.

Learning in the model learning unit 109 in FIG. 3 may be performed any time before identification processing using the mode. With respect to the aforementioned model, the manufacturer may generate a typical model beforehand or the dealer may generate a model suitable for the driver. Sequence learning during driving may be possible although it causes much burden of processing on the computer.

Next, effects of the present embodiment will be described. According to the present embodiment, vehicle data from the vehicle sensor 201 and position data from the position sensor 202 are used to extract a stop operation, a start operation and a follow-up driving operation that are driving operation modes in which there is a big difference between normal driving and non-normal driving, and then determination processing is performed. In addition, the driving operation mode is selected for each individual, for each place and for each operation, and whether the driving is normal driving is determined. Therefore, the present embodiment can provide a driving state determination system in which whether the driving is normal driving can be well determined and the driving state can be determined in various driving environments and according to individual differences among respective drivers. Furthermore, the result of the determination of the driving state can be used for driving guidance.

Second Embodiment

FIG. 5 is a block diagram illustrating the driving state determination system according to the second embodiment of the present invention. In FIG. 5, units identical to those in FIG. 1 have numbers identical to those in FIG. 1' and their description will not be necessary. In FIG. 5, the computer 110 has a model data reading unit 111 and a model updating unit 112 in addition to the constitution of the computer 100 in FIG. 1. A model data distribution medium 301 is provided outside the computer 110.

The model data distribution medium 301 has the function of distributing model data of the driving operation mode. For example, a vehicle manufacturer may generate model data of a typical driving operation mode and distribute the model data through a medium such as the Internet and CD-ROM. The model data reading unit 111 downloads model data for each driving operation mode from the model data distribution medium 301. The model updating unit 112 stores the model data of the driving operation mode read by the model data reading unit 111, in a suitable position.

Here, model data of the driving operation mode is an index of the driving method according to each driver's environment. Therefore, use of the model data may need to be paid or authenticated. That is, the download of model data may be permitted or its use license may be validated in response to payment from a user.

Model data of the driving operation mode may be divided according to levels. For example, model data for beginners and those for expert drivers may be different from each other, and the model data for expert drivers can be selected only when the result of the determination of the level higher than a certain level has been obtained regarding the beginners' driving operation mode.

The driving state determination system according to the present embodiment downloads model data from outside, selects a driving operation mode for each individual, for each place and for each operation and compares the model data and sensor data, thereby determining whether the driving is normal driving. Accordingly, the present embodiment can provide a driving state determination system in which whether the driving is normal driving is determined and the driving state can be determined, in various driving environments and according to individual differences among respective drivers.

Furthermore, the result of the determination of the driving state can be used for driving guidance.

Third Embodiment

Figure 6:
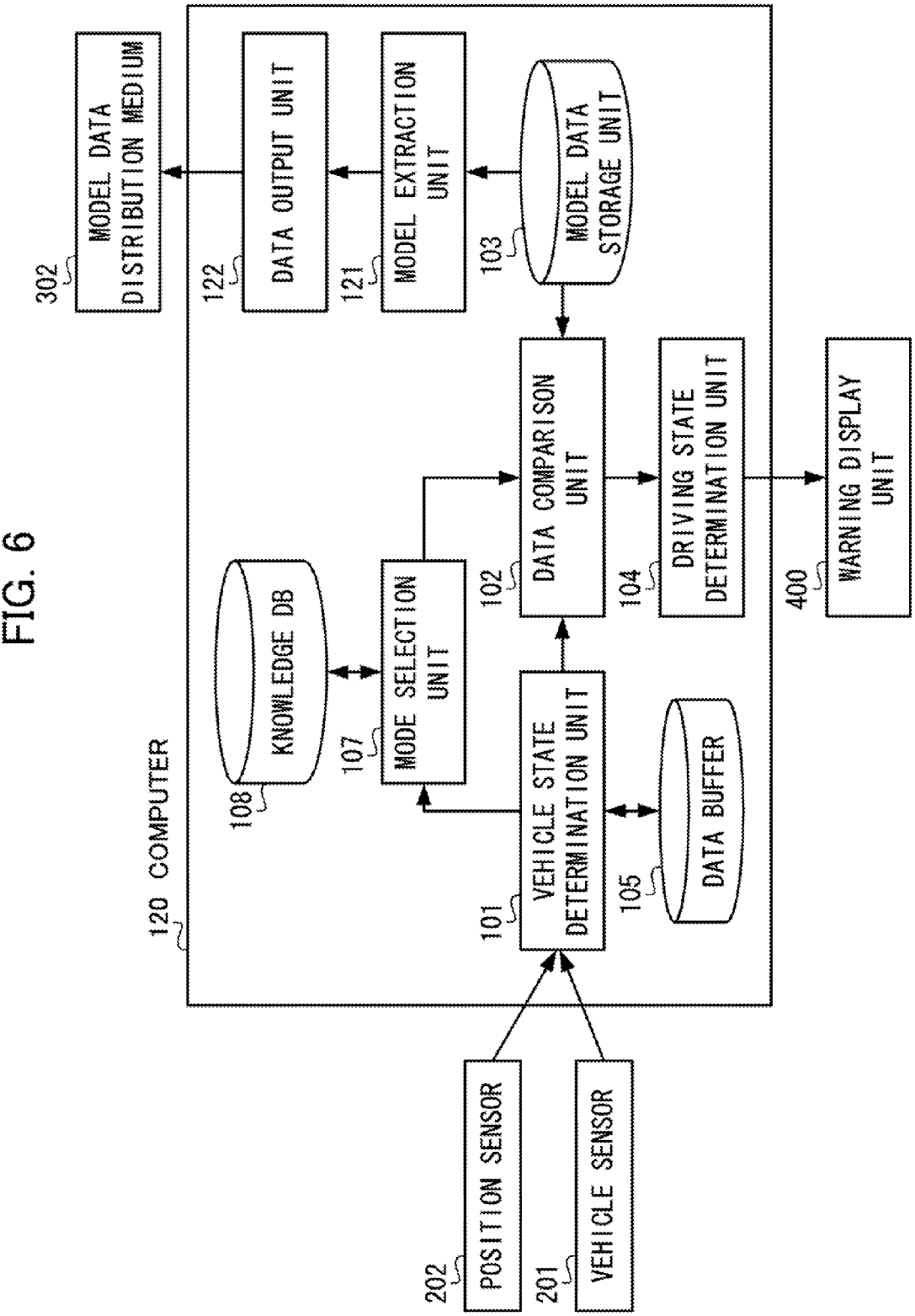
FIG. 6 is a block diagram according to the third embodiment of the present invention.

FIG. 6 is a block diagram illustrating a driving state determination system according to the third embodiment of the present invention. In FIG. 6, units identical to those in FIG. 1 have numbers identical to those in FIG. 1 and their description will not be necessary. In FIG. 6, the computer 120 has a model extraction unit 121 and a data output unit 122 in addition to the constitution of the computer 100 in FIG. 1. A model data distribution medium 302 is provided outside the computer 120.

The model data distribution medium 302 has the function of collecting model data of the driving operation mode transmitted from the driving state determination system. For example, in order that the vehicle manufacturer may grasp the driving state of the driver, the model data distribution medium 302 collects the model data through a medium such as the Internet and a memory card. The model extraction unit 121 takes model data of a driving operation mode to be outputted, from a suitable position of the model data storage unit 103. The data output unit 122 transmits the model data of the driving operation mode extracted by the model extraction unit 121 to the model data distribution medium 302, or writes it out.

Here, model data of the driving operation mode that has been learned and accumulated is product improvement data useful for the vehicle manufacturer and personal information of the driving method according to each driver's environment. The use of model data of the driving operation mode may need to be paid by the vehicle manufacturer or authenticated. Next, effects of the present embodiment will be described.

According to the present embodiment, model data of the driving operation mode can be taken outside. Therefore, the model data can be stored in the external model data distribution medium 302 and then analyzed, which is useful for improving the driving operation mode. Accordingly, the present embodiment can provide a driving state determination system in which whether the driving is normal driving can be well determined and the driving state can be determined, in various driving environments and according to individual difference

Fourth Embodiment

Figure 7:
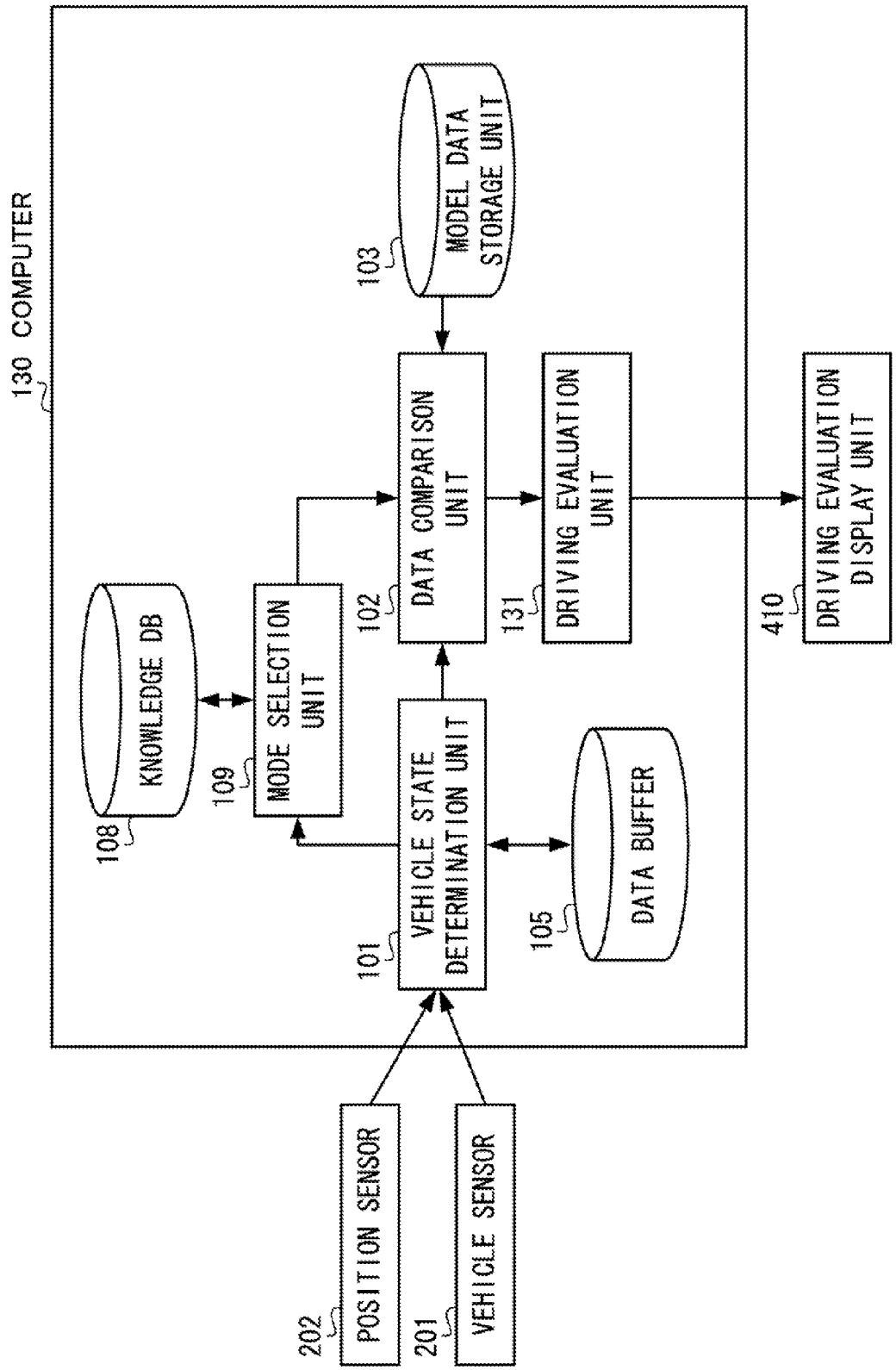
FIG. 7 is a block diagram according to the fourth embodiment of the present invention.

FIG. 7 is a block diagram illustrating a driving state determination system according to the third embodiment of the present invention. In FIG. 7 units identical to those in FIG. 1 have numbers identical to those in FIG. 1 and their description will not be necessary. In FIG. 6, the computer 130 has a driving evaluation unit 131 and a driving evaluation display unit 410 instead of the driving state determination unit 104 and the warning display unit 400 of the computer 100 in FIG. 1, respectively. The computer 130 may or may not be mounted on the automobile. The driving evaluation unit 131 may be included in, for example, the driving state determination unit 104, as part of its function. Which is determined depends on the user's choice.

According to the present embodiment, the notice regarding whether the driving is abnormal driving is not presented directly to the driver, but the driving evaluation unit 131 marks (quantifies) how the driving corresponds to the referred model data of the driving operation mode, thereby evaluating the driving. The model data storage unit 103 stores model data that is obtained by modeling, e.g., the driving operation data learned from the driving of a teacher of an automobile driving school. The data comparison unit 102 compares various sensor data indicating the driving state with the model data stored in the model data storage unit 103 to know how they are concordant to each other. The driving evaluation unit 131 obtains the comparison result, calculates the concordance rate during a certain time period or within a certain section, or calculates the accumulated concordance rate, and outputs the calculation result to the driving evaluation display unit 410.

The driving evaluation display unit 410 receives the calculation result as an input from the driving evaluation unit 131 and displays the calculation result as a driving evaluation. If the computer 130 is mounted on an automobile, the driving evaluation display unit 410 is positioned where the driver of the automobile can see the display. If the automobile is a business vehicle, the driving evaluation display unit 410 may be positioned where an employer or a manager can see the display. When the computer 130 is not mounted on the automobile and if the automobile is a business vehicle, the driving evaluation display unit 410, is set up at an office that manages the business vehicle or at a data center of a portal business owner of the Internet.

Here, if the driving evaluation display unit 410 is installed so that a third person other than the driver can see the display, the third person can learn from the displayed driving evaluation whether the driver is driving close to exemplary driving. Therefore, the driving evaluation data can be used to enhance motivation for exemplary driving by, for example, presenting an award for good driving, and cash back for eco-friendly driving.

According to the present embodiment, model data as a model driving operation is downloaded externally and previously stored in the model data storage unit 103. The data comparison unit 102 reads out the stored model data of the driving operation mode from the model data storage unit 103, compares data received from the vehicle state determination unit 101 and the model data of the driving operation mode, and supplies the comparison result to the driving evaluation unit 131. Then, the driving evaluation unit 131 obtains the comparison result, calculates the concordance rate during a certain time period or within a certain section, or calculates the accumulated concordance rate, displays the concordance rate on the driving evaluation display unit 410 and at the same time stores the concordance rate in any storage medium (not shown). The higher the concordance rate becomes, the more exemplary the driving becomes, and an award or a cash award is presented on the basis of the data.

In this way, according to the present embodiment, the concordance rate with the referred model data of the driving operation mode is calculated as an evaluation index and presented. Therefore, the present embodiment can provide a driving state determination system in which the driving state can be determined in various driving environments and according to individual differences among respective drivers. Furthermore, the present embodiment allows for driving guidance to recommend exemplary driving.

The above description of each embodiment has covered the driving operation of an automobile, but may cover the driving operation of an aircraft, a ship, an motorbike, or a wheelchair.

EXAMPLES

Figure 8:
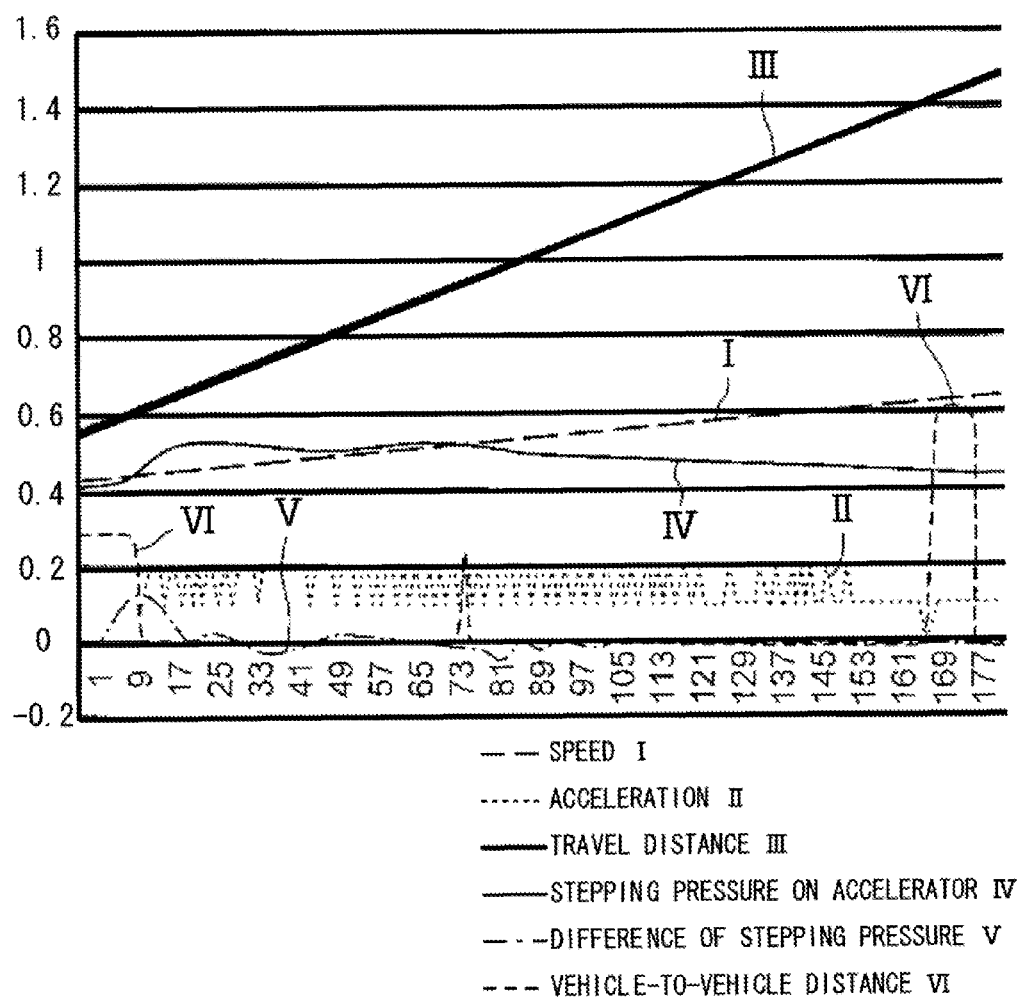
FIG. 8 is a graph illustrating one example of various sensor data during normal driving.
Figure 9:
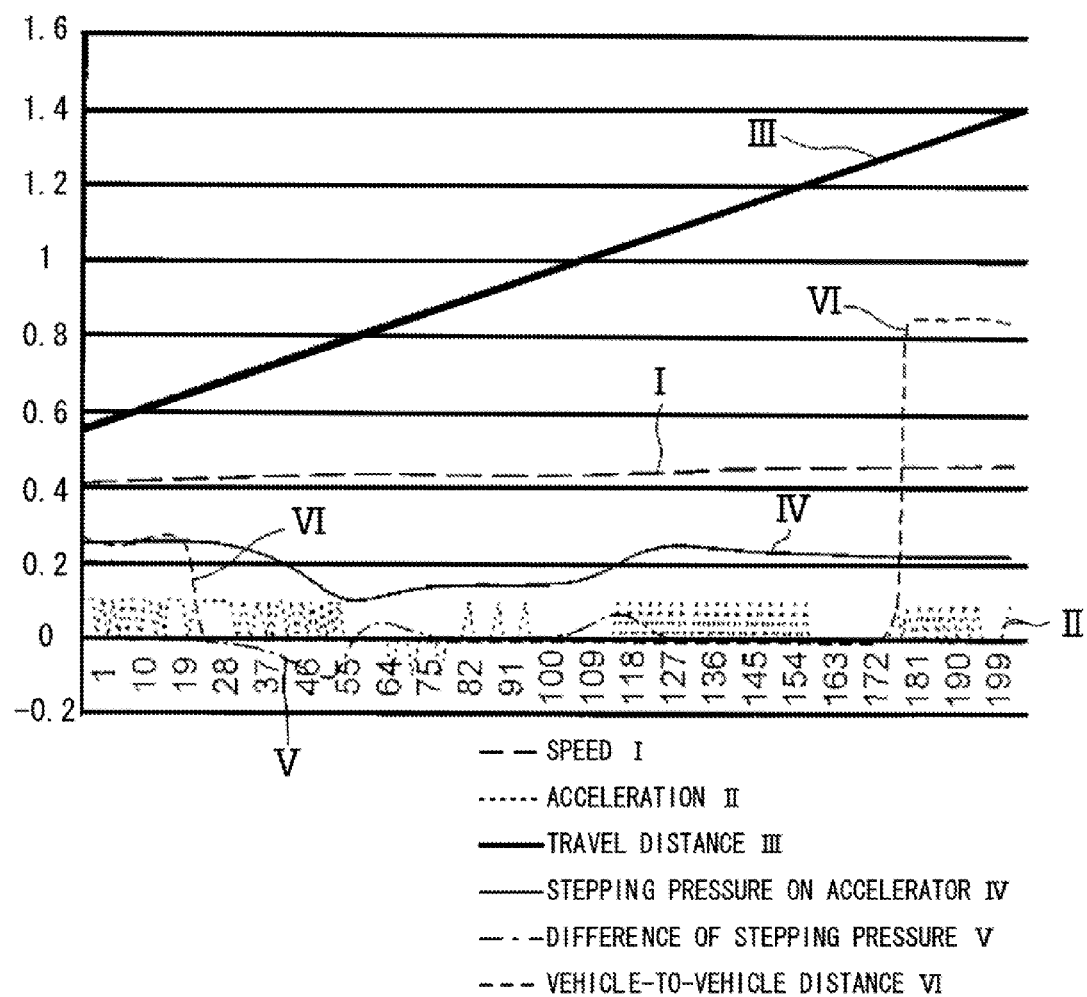
FIG. 9 is a graph illustrating one example of various sensor data during unhurried driving.

Next, concrete examples of the present invention will be described. FIGS. 8 and 9 are graphs illustrating an example of vehicle data detected by the vehicle sensor 201 and position data detected by the position sensor 202. FIG. 8 illustrates a data example of normal driving; and FIG. 9 illustrates a data example of unhurried driving. The horizontal axis of the graph indicates a time period and its unit is 1/15 second and the original data is taken every 1/15 second. The scales of the units of the vertical axis are adjusted to plot all data to the same graph.

In FIGS. 8 and 9, the speed indicated by I is a temporal change at 100 km per hour, the acceleration indicated by II is a temporal change of the speed difference for 500 m, and the travel distance indicated by III is a temporal change within the range of 100 m. The stepping pressure of the accelerator indicated by IV is a moving average for one second and its unit is 10 cm. The stepping pressure difference indicated by V is a temporal change of the stepping pressure of the accelerator every 1/15 second. With respect to the vehicle-to-vehicle distance indicated by VI, "0" of the vertical axis is 80 in, "1" is 0 m and the distance greater or equal to 80 m is "0". In these graphs, data is extracted between 50 m and 150 m of the travel distance from a stop position, which corresponds to the aforementioned case where the start distance is 150 m and the end distance is 50 m.

Figure 10:
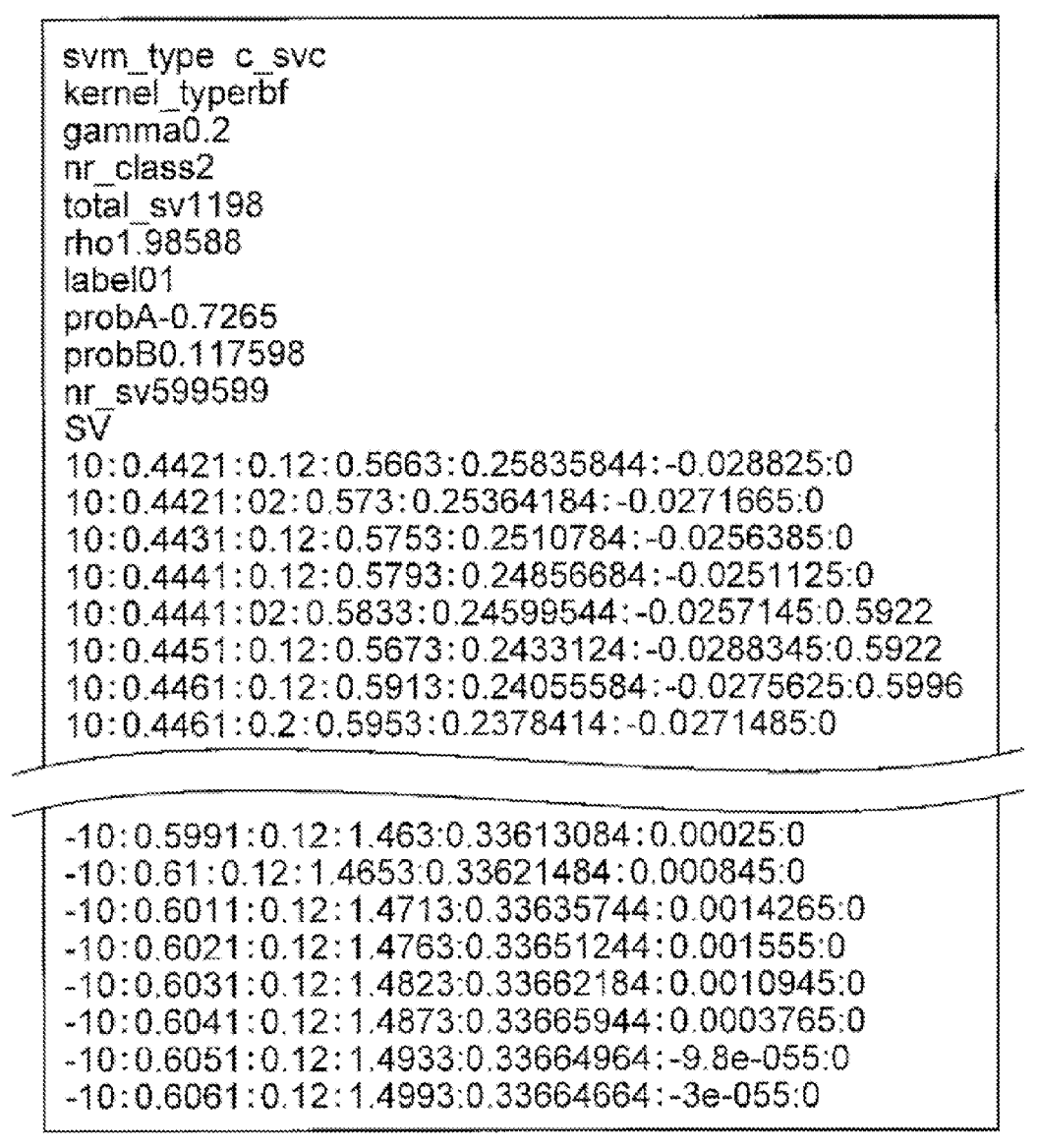

A plurality of aforementioned model data are prepared and are learned with the use of Support Vector Machine (SVM) thereby to generate a learning model. FIG. 10 illustrates one example of a SVM learning model. This model is an example generated, using libsvm and is well-known in literature on it (R.-E. Fan, P.-H. Chen, and C.-J. Lin, "Working set selection using the second order information for training. SVM.", Journal of Machine Learning Research 6, 1889-1918, 2005).

In FIG. 10, lines up to the 1th line are SVM parameters. Each line from the 12th line describes the following values. The start of the line indicates which of unhurried driving or normal driving the driving is (1 or −1), then after "0" comes the speed, after "1" comes the acceleration, after "2" comes the travel distance, after "3" comes the stepping pressure on the accelerator, after "4" comes the difference of the stepping pressure on the accelerator, and, after "5" comes the vehicle-to-vehicle distance.

Figure 11:
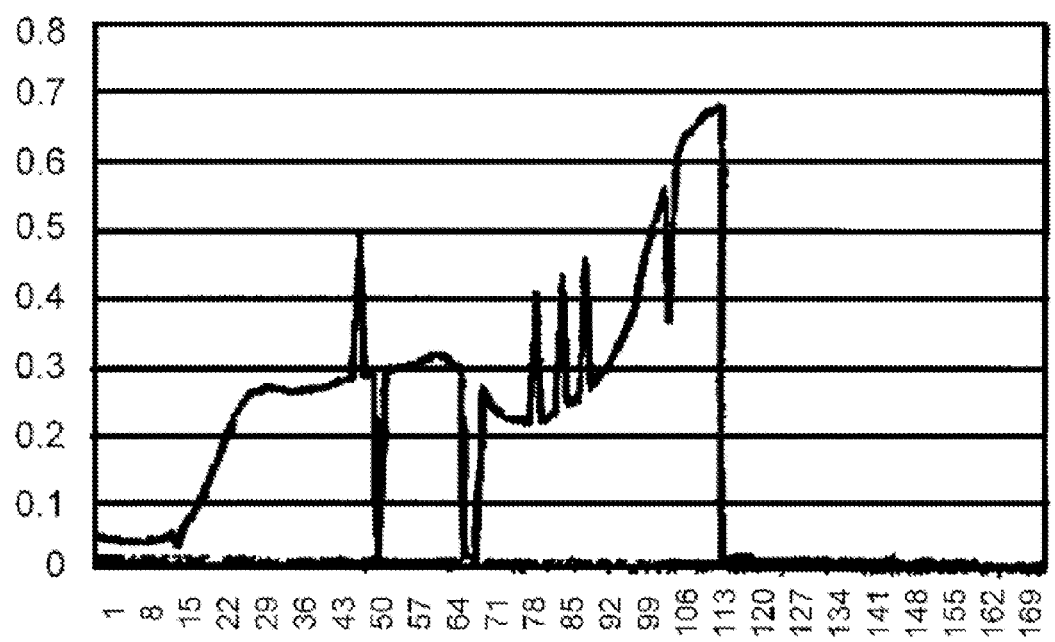
FIG. 11 is a graph illustrating one example of sensor data.
Figure 13:
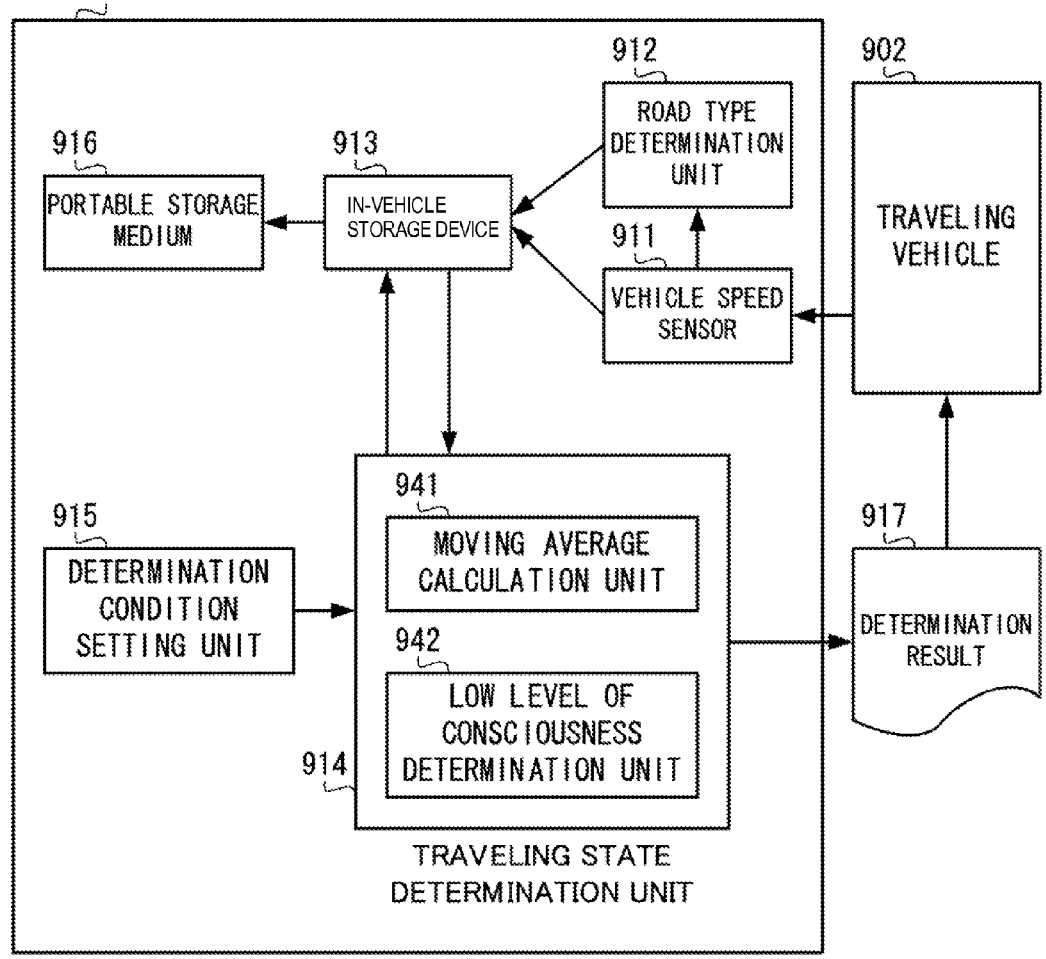
FIG. 13 is a block diagram illustrating one example of the driving state determination processing device in Patent Literature 1.

FIG. 11 illustrates one example of determining acquired sensor data, using the aforementioned model data. The unit of the horizontal axis of FIG. 11 is 1/15 second unit, similar to that in FIGS. 8 and 9. The vertical axis of FIG. 11 is an inference result and if it is determined that the driving is normal driving, the value is approximate to "1" and if it is determined that the driving is unhurried driving, the value is approximate to "0". Since sensor data include an error or a disturbance factor (e.g., when a pedestrian is crossing in front), accurate determination may not be possible. In FIG. 11, since data less than 0.5 is greater or equal to 50% on the basis of the entire series of acceleration driving operation, the driving is determined to be unhurried driving. According to the result of the determination of unhurried driving or normal driving, the degree of risk and risk occurrence information are displayed by the warning display unit 400.

FIG. 12 illustrates one example of risk occurrence information according to the degree of risk. As illustrated in FIG. 12, a degree of risk 1 indicates a sharp curve and road surface freezing, and is the lowest degree of risk. A degree of risk 2 indicates frequent injury accidents, and is the intermediate level of risk. A degree of risk 3 indicates frequent fatal accidents, and is the highest degree of risk.

In normal driving, the warning display unit 400 presents risk occurrence information higher or equal to the degree of risk 2. However, when the driving is determined to be unhurried driving as in FIG. 11, the driver drives unhurriedly. Therefore, in this case, risk occurrence information of the degree of risk 3 is presented. It is because in unhurried driving, the driver can drive on a road with a road condition such as a sharp curve and road surface freezing or on a road where injury accidents frequently occur, and sufficiently deal with these risks even without its degree of risk. The degree of risk is not limited to three stages as illustrated in FIG. 12, but can be set to other plurality of stages.

According to the present example, the driving state is determined regarding how much the driving of the driver is different from normal driving or model driving. Therefore, the level, frequency and method of driving guidance can be selected to be presented to the driver. Model driving may be exemplary driving in terms of driving safely, fuel efficiently, and economically. The present invention can be applied to a driving simulator of an automobile driving school for determining the driving state and performing driving guidance on the basis of the result of the determination, or a driving game.

Although the present invention is shown and described referring to illustrative embodiments, the present invention is not limited to these embodiments and their variations. It should be apparent for a person skilled in the art that the present invention can be variously modified without departing from the spirit and scope of the present invention defined in appended claims.

The present application is the National Phase of PCT/JP2009/058606, filed May 7, 2009, which is based on Japanese Patent Application No. 2008-122925 filed on May 9, 2008, claims its priority and the whole content of the disclosure is incorporated herein by reference.

The invention claimed is:

1. A driving state determination method comprising steps of:
    detecting sensor data including vehicle data and position data, the vehicle data including at least the current speed and the current acceleration of an automobile to be determined, the position data indicating the current position of the automobile;
    determining the vehicle state of the automobile on the basis of the sensor data;
    selecting one driving operation mode that corresponds to the vehicle state determined in the determining step, from a plurality of driving operation modes; and
    comparing the sensor data and model data of the selected driving operation mode among model data held in a holding unit that holds model data for each of the driving operation modes; and
    determining the driving state on the basis of the comparison result obtained in the comparing step,
    wherein the step of determining the vehicle state of the automobile includes:
    calculating a degree of normal driving or abnormal driving of the driver of the automobile to be determined; and
    displaying the calculated degree.

2. A driving state determination method according to claim 1, wherein the step of determining the driving state further includes the steps of:
    quantifying the degree of similarity of the driving state of the automobile and the model data of the driving operation mode; and
    displaying the quantified degree of similarity.

3. The driving state determination method according to claim 1, further including a distance determination step to determine whether the automobile is running and the travel distance is within the range between a predetermined start distance and a predetermined end distance, on the basis of the sensor data, wherein
    the step of selecting selects a start operation as the driving operation mode that corresponds to the vehicle state, if the distance determination step determines that the automobile is running and the travel distance is within the range.

4. The driving state determination method according to claim 1, further including a follow-up driving determination step to determine whether the automobile is running and, within a predetermined forward vehicle-to-vehicle distance from the automobile to be determined, another automobile is running, on the basis of the sensor data, wherein
the step of selecting selects a follow-up operation as the driving operation mode that corresponds to the vehicle state, if the follow-up driving determination step determines that the automobile is running and the another automobile is running.

5. The driving state determination method according to claim 1, further including a stop determination step to determine whether the automobile is stopped, on the basis of the sensor data; wherein
the step of selecting selects a stop operation based on the sensor data in a running state within a predetermined distance from the current stop position of the automobile, as the driving operation mode that corresponds to the vehicle state, if the stop determination step determines that the automobile is stopped.

6. The driving state determination method according to claim 1, further including a step of updating and storing the model data of the driving operation mode read out from a model data distribution medium that stores model data of the driving operation mode as an index of the driving method, in a holding unit.

7. The driving state determination method according to claim 1, further including a step of reading out the desired model data of the driving operation mode from a holding unit and storing the read-out model data in a model data distribution medium.

8. A driving state determination system comprising:
a sensor to detect sensor data including vehicle data and position data, the vehicle data including at least the current speed and the current acceleration of an automobile to be determined, the position data indicating the current position of the automobile to be determined;
a vehicle state determination unit to determine a vehicle state of the automobile to be determined, on the basis of the sensor data;
a selection unit to select one driving operation mode that corresponds to the vehicle state determined by the vehicle state determination unit, from a plurality of driving operation modes;
a holding unit to hold model data of each of the driving operation modes;
a comparison unit to compare the sensor data and model data of the selected driving operation mode; and
a driving state determination unit to determine the driving state on the basis of the comparison result by the comparing unit, wherein the driving state determination unit calculates the degree of normal driving or abnormal driving of the driver of the automobile to be determined on the basis of the comparison result by the comparison unit and displays the calculated result on the display unit.

9. The driving state determination system according to claim 8, wherein the driving state determination unit further quantifies a degree of similarity between the driving state of the automobile and model data of the driving operation mode on the comparison result by the comparison unit, and displays the quantified result on a display unit.

10. The driving state determination system according to claim 8, wherein the vehicle state determination unit determines whether the automobile is running and the travel distance is within the range between a predetermined start distance and a predetermined end distance; and wherein
the selection unit selects a start operation as the driving operation mode that corresponds to the vehicle state, if the distance determination unit determines that the automobile is running and the travel distance is within the range.

11. The driving state determination system according to claim 8, further including a follow-up driving determination unit to determine whether the automobile is running and another automobile is running within a predetermined forward vehicle-to-vehicle distance from the automobile to be determined, on the basis of the sensor data, wherein
the selection unit selects a follow-up operation as the driving operation mode that corresponds to the vehicle state if the follow-up driving determination unit determines that the automobile is running and the another automobile is running.

12. The driving state determination system according to claim 8, further including a stop determination unit to determine whether the automobile is stopped, on the basis of the sensor data, wherein
the selection unit selects a stop operation based on the sensor data in a running state within a predetermined distance from the current stop position of the automobile, as the driving operation mode that corresponds to the vehicle state, if the stop determination unit determines that the automobile is stopped.

13. The driving state determination system according to claim 8, further including: a model data distribution medium to store model data of the driving operation mode as an index of the driving method; and a writing unit to update and store the model data of the driving operation mode read out from the model data distribution medium, in the holding unit.

14. The driving state determination system according to claim 8, further including: a reading unit to read out a desired model data of the driving operation mode from the holding unit; and a writing unit to store the model data of the desired driving operation mode read out from the holding unit, in a model data distribution medium.

15. A non-transitory computer readable recording medium that is tangibly coded by a computer program operating on a computer, the program making the computer execute processing of:
detecting sensor data including vehicle data and position data, the vehicle data including at least the current speed and the current acceleration of the automobile to be determined, the position data indicating the current position of the automobile to be determined;
determining the vehicle state of the automobile to be determined, on the basis of the sensor data;
selecting one driving operation mode that corresponds to the vehicle state, on the basis of data of the vehicle state determined by the vehicle state determination processing, from a plurality of driving operation modes;
comparing the sensor data and model data of the selected driving operation mode among model data held in a holding unit that holds model data for each of the driving operation modes; and
determining the driving state on the basis of the comparison result obtained in the comparison processing,
wherein the step of determining the vehicle state of the automobile includes:

calculating a degree of normal driving or abnormal driving of the driver of the automobile to be determined; and displaying the calculated degree.

16. The recording medium according to claim 15, wherein the processing of determining the driving state further includes processing of:

quantifying the degree of similarity between the driving state of the automobile and the driving operation mode; and displaying the quantified degree of similarity.

17. The recording medium according to claim 15, making the computer further execute distance determination processing of determining whether the automobile is running and the travel distance is within the range between a predetermined start distance and a predetermined end distance, on the basis of the sensor data, wherein the processing of selecting selects a start operation as a driving mode that corresponds to the vehicle state, if the distance determination processing determines that the automobile is running and the travel distance is within the range.

18. The recording medium according to claim 15, making the computer further execute follow-up driving determination processing of determining whether the automobile is running and another automobile is running within a predetermined forward vehicle-to-vehicle distance from the automobile to be determined, on the basis of the sensor data, wherein the processing of selecting selects a follow-up operation as a driving mode that corresponds to the vehicle state, if the follow-up driving determination processing determines that the automobile is running and another automobile is running.

19. The recording medium according to claim 15, making the computer further execute stop determination processing of determining whether the automobile is stopped, on the basis of the sensor data, wherein the processing of selecting selects a stop operation based on the sensor data in a running state within a predetermined distance from the current stop position of the automobile, as a driving operation mode that corresponds to the vehicle state, if the stop determination processing determines that the automobile is stopped.

20. The recording medium according to claim 15, making the computer further execute processing of updating and storing model data of the driving operation mode read out from a model data distribution medium that stores model data of the driving operation mode as an index of the driving method, in the holding unit.

21. The recording medium according to claim 15, making the computer further execute processing of reading out a desired model data of the driving operation mode from the holding unit and storing the model data in the model data distribution medium.

* * * * *